March 24, 1970     S. C. WARREN     3,502,286
AUTOMATIC LOCKING TAIL PROBE TIP
Filed Jan. 16, 1968     4 Sheets-Sheet 1
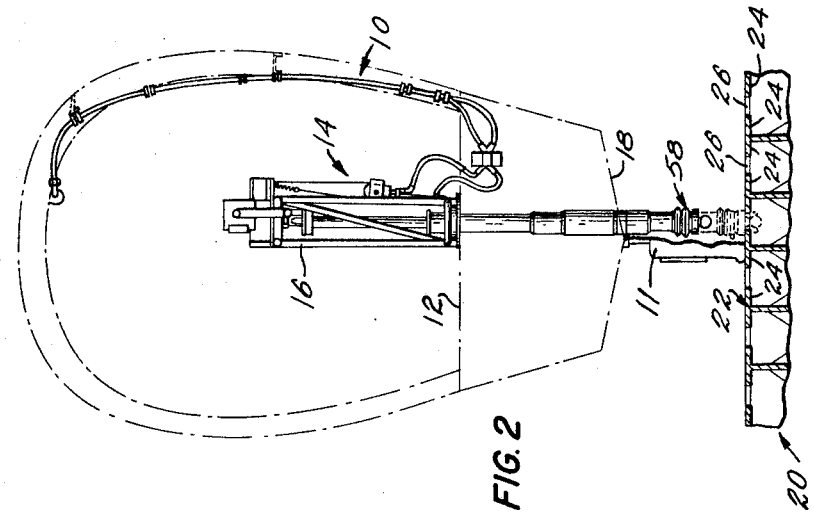
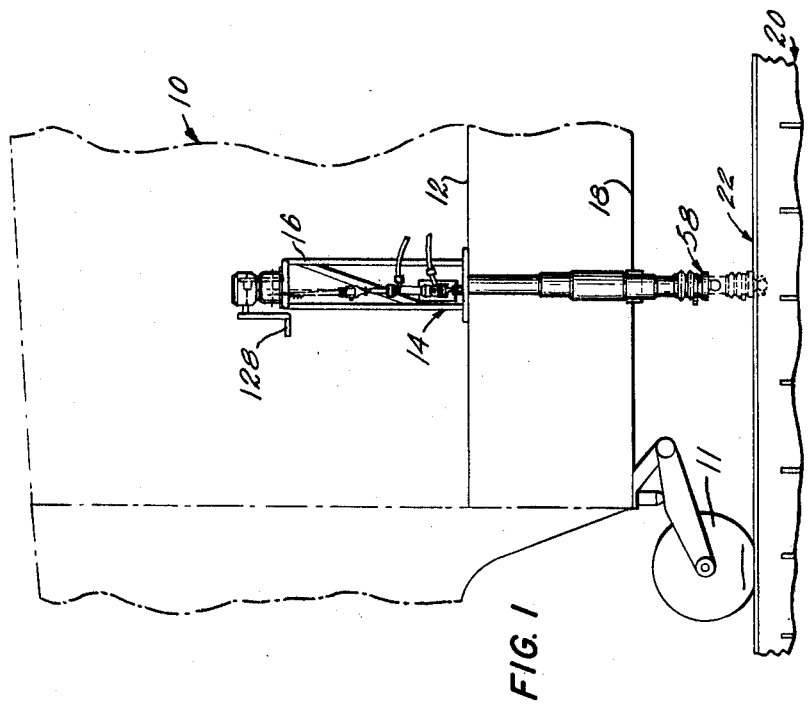
*INVENTOR*
Sidney Charles WARREN
*ATTORNEY*

March 24, 1970 S. C. WARREN 3,502,286
AUTOMATIC LOCKING TAIL PROBE TIP
Filed Jan. 16, 1968 4 Sheets-Sheet 2

INVENTOR
Sidney Charles WARREN

ATTORNEY

INVENTOR
Sidney Charles WARREN
ATTORNEY

March 24, 1970　　　S. C. WARREN　　　3,502,286
AUTOMATIC LOCKING TAIL PROBE TIP

Filed Jan. 16, 1968　　　　　　　　　　　　　　4 Sheets-Sheet 4

*INVENTOR*
Sidney Charles WARREN

*ATTORNEY*

United States Patent Office 3,502,286
Patented Mar. 24, 1970

3,502,286
AUTOMATIC LOCKING TAIL PROBE TIP
Sidney Charles Warren, Pierrefonds, Quebec, Canada, assignor to United Aircraft of Canada Limited, Quebec, Canada
Filed Jan. 16, 1968, Ser. No. 698,184
Int. Cl. B64f 1/16
U.S. Cl. 244—17.17    12 Claims

ABSTRACT OF THE DISCLOSURE

A mooring device for the rear end of a helicopter which has a telescopic leg and an expandable ball-segment locking unit on the end of the leg. As the ball-shaped locking unit at the end of the leg touches in a slot on the deck, it expands and locks the helicopter to the deck.

---

The present invention relates to a mooring apparatus for securing a helicopter or the like, to a landing platform and more particularly to a mooring apparatus for securing the tail of a helicopter to the platform.

Heretofore, many attempts have been made to moor a helicopter to a landing platform. Among the more successful attempts is the securing device described and claimed in U.S. Patent 3,303,807, Stewart et al., issued Feb. 14, 1967. However, as shown in the above U.S. patent only the front part of the helicopter is secured at one point and thus its remainder of the tail of the aircraft is allowed to pivot about this point unless it is tied down. This may prove difficult in high wind conditions.

It is an aim of the present invention to provide a tail mooring apparatus which can be operated in cooperation with a securing device as shown in U.S. Patent 3,303,807 or the like.

It has also been contemplated to use a relatively larger mooring apparatus of the present invention as the main helicopter mooring device in combination with a similar tail mooring apparatus.

A construction in accordance with the present invention includes a mooring apparatus for mooring a helicopter aircraft or the like, the mooring apparatus adapted to be releasably locked to an anchoring member, the mooring apparatus comprising a tubular body extending from the aircraft, the outward end of the tubular body being open and having locking dogs protruding therefrom, a pin movable axially within the tube and biased to move the dogs to a spread, locking position; retaining means suitable to retain the dogs in an unlocked position, the retaining means being movable to release the dogs allowing them to be spread by said pin.

In a more specific arrangement the anchoring member mentioned in conjunction with the above invention is a raised flat deck which defines parallel slots. The retainer means of the invention comprises an annular sleeve which is adapted to slide axially over the tubular body and is spring biased to normally override the dogs, retaining them in an unlocked position. When the annular sleeve abuts the shoulders of the deck defining the slots it is forced against the spring bias to release the dogs and allow the pin to slide axially between the dogs expanding them to their locked position whereby the dogs will lock underneath the deck shoulders.

Having thus generally described the nature of the invention, particular reference will be made to the accompanying drawings showing by way of illustration a preferred embodiment thereof and in which:

FIGURE 1 is a side elevation view of the mooring apparatus as shown mounted in the fuselage of a helicopter, with the helicopter shown in dotted lines;

FIGURE 2 is a side elevation view of the apparatus shown in FIGURE 1 taken from a different angle;

Figure 3:
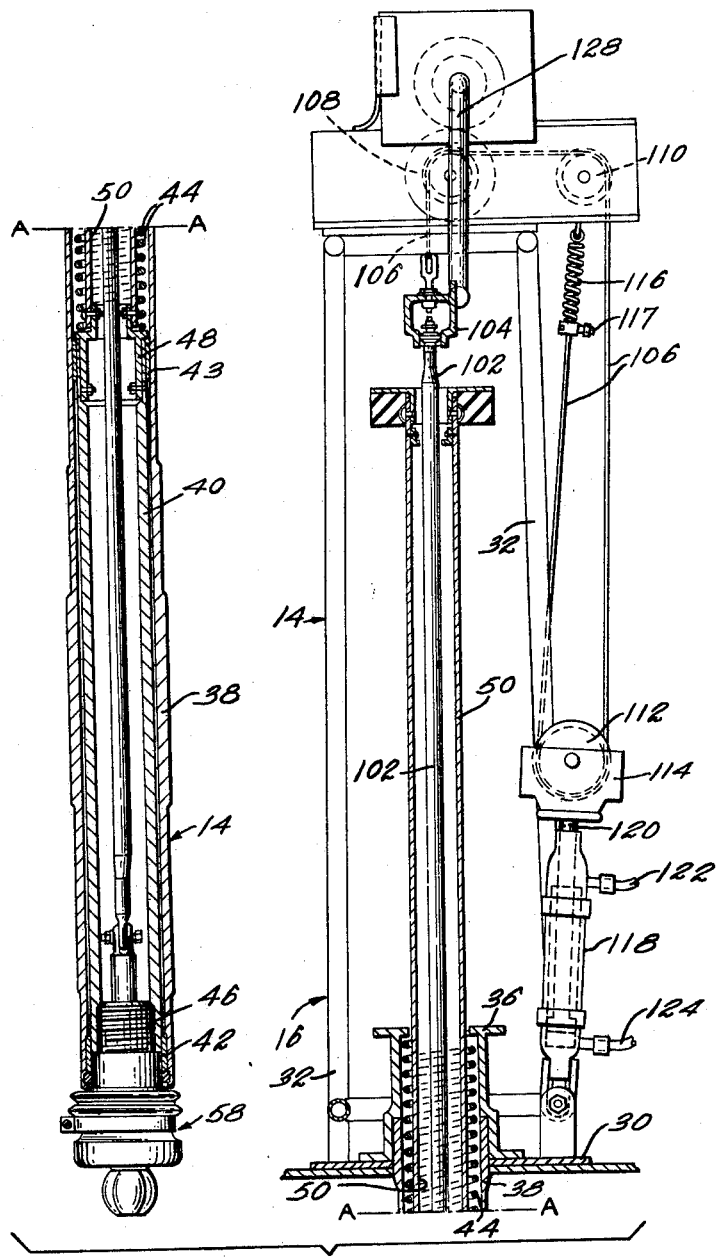
FIGURE 3 is an axial cross section of the mooring apparatus showing the device in a retracted position. The mooring apparatus is broken along the line A—A in order to show it in enlarged detail.
Figure 4:
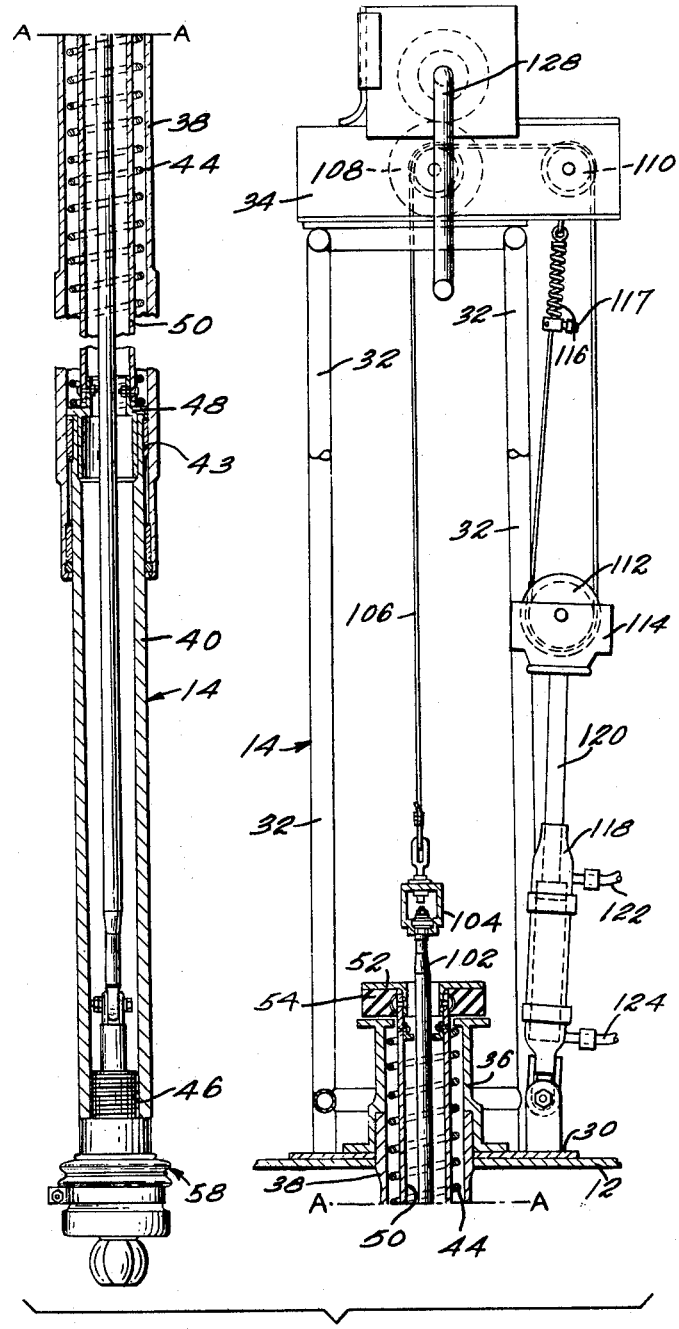
FIGURE 4 is an axial cross section similar to FIGURE 3 showing the apparatus in a fully extended position.

As shown in FIGURES 1 and 2 the mooring apparatus is normally mounted in the rear portion of the fuselage of the helicopter which is indicated by the numeral 10 in FIGURES 1 and 2. The fuselage 10 includes a floor 12, wheel 11 and the mooring apparatus 14 which includes a mounting frame 16 and is mounted to the floor 12. A portion of the mooring apparatus 14 is also secured to the lower helicopter wall 18 as shown in the figures.

As discussed previously, the mooring apparatus 14 is provided to secure the end of the helicopter 10 to the deck 20. In this case, the deck is shown having a false deck surface 22 which is formed with shoulders 24 defining slots 26.

The mounting frame 16 of the mooring device 14 as shown in FIGURES 1 to 4, includes a lower mounting plate 30 and tubular uprights 32 extending upwardly from the mounting plate 30 and supporting a pulley box 34.

On the mounting plate 30 is a flanged sleeve 36 which is mounted centrally thereof. Coincident with this sleeve 36 is an orifice through the mounting plate 30 and defined in the floor 12. A fixed elongated outer sleeve 38 extends downwardly through the floor 12 and the lower wall 18 where it is fixed thereto. The outer sleeve 38 is also fixed at its upper end to the interior of the flanged sleeve 36.

An inner telescopic sleeve 40 is adapted for axial sliding movement within the outer sleeve 38 and is journalled within a stationary bearing 42 fixed with the end of the outer sleeve 38. A travelling bearing 43 is provided on the upper end of the inner sliding sleeve 40 providing the necessary two point contact between the inner sleeve 40 and the outer sleeve 38. A spring 44 extends between the top end of the flange sleeve 36 and the top of the inner sleeve 40, biasing the inner sleeve in a downward direction. The lower end of the inner sleeve 40 is provided with an inner threaded portion 46.

The top end of the inner sleeve 40 is attached to a coupling 48 which in turn is connected to an elongated tubular extension 50. The tubular extension 50 extends axially within the spring 44 and through an aperture in the top of the flange sleeve 36. The tubular extension 50 is provided at its upper end with a flange 52 which mounts an abutting rubber pad 54. The pad 54 cushions the contact between the flange 52 and the top of the flange sleeve 36.

The probe and mooring unit 58 of the mooring apparatus 14 is best shown in FIGURES 5 to 8. It includes a tubular housing 60 which has at one end a reduced diameter collar portion 62 which is threaded on the outside. The housing 60 is also provided with a radial flange 64. The end opposite the reduced collar 62 is open ended and is threaded on its inside surface at 66. The housing 60 defines an interior chamber 68.

A flanged sleeve 70, which is threaded exteriorly throughout the major portion thereof, is threaded to the surface 66 of housing 60. The flange sleeve 70 includes downwardly extending lugs 72, 73, 74, 75, and 76. Each of the lugs 72 to 76 subtends a pivot pin 78 with an adjacent lug. Locking dogs 80, 81, 82, 83, and 84 are mounted on each pivot pin 78 between the lugs 72, 73, 74, 75, and 76 respectively. Each of these locking dogs includes an outwardly projecting lever portion 86 extending on the other side of the pivot pin 78.

Figures 5, 7:
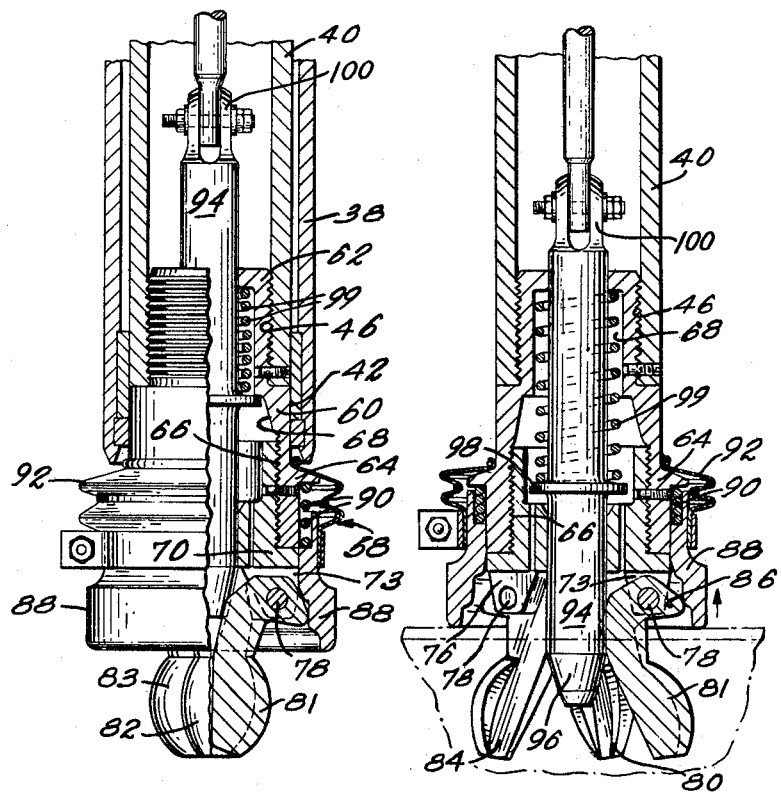
FIGURE 5 is a partial axial cross section of a detail of the apparatus showing the dogs in an unlocked position.
FIGURE 7 is an axial cross section of detail of the device shown in FIGURE 5 but with the dogs in a spread locking position.
Figures 6, 8:
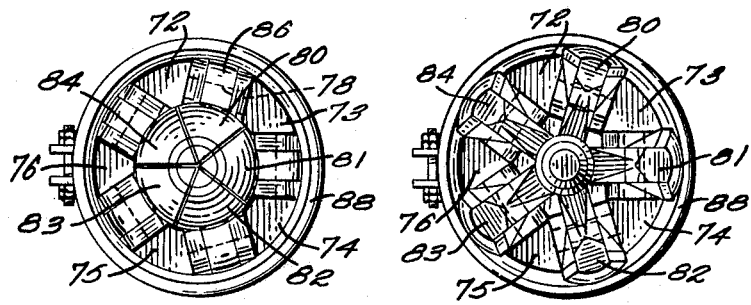
FIGURE 6 is a bottom plan view of the apparatus shown in FIGURE 5.
FIGURE 8 is a bottom plan view of the apparatus shown in FIGURE 7.

A retaining sleeve 88 is mounted for sliding movement on the exterior of the housing 60 and is biased by a spring 90 which is secured at one end to the flange 64. The spring 90 is covered with a rubber cover 92 as shown in the drawings. The retaining sleeve 88 has a stepped interior surface which is adapted to abut against the lever portions 86 of the respective dogs 80 to 84 when the retaining sleeve 88 overlies the levers 86 as shown in FIGURE 5. This prevents the dogs 80 to 84 from spreading as shown in FIGURE 7.

Finally, the unit 58 is provided with a central pin 94 which is also adapted for axial sliding movement within the housing 60. The pin 94 includes a conical end 96 which can best fit between the dogs 80 to 84. The pin 94 is also provided with a radial flange 98 and retains a spring 99 between it and the end of the collar 62. This spring 99 biases the pin 94 to a downward position between the dogs 80 to 84.

The upper end of the pin 94 is, as best seen in FIGURES 5 and 7, provided with a bracket 100 to which is attached an extension rod 102 which extends throughout the length of the inner sleeve 40 and the outer sleeve 38 and through the inner sleeve extension 50. At the top of the extension 102 is a bracket 104 to which is connected a wire 106. The wire extends upwardly through the frame 16 over a pulley 108 in the pulley box 34 then over a second pulley 110 in the same pulley box 34 then down to a pulley 112 which is mounted in a pulley mounting bracket 114. The end of the wire 106 is attached to a tensioning spring 116.

The pulley mounting bracket 114 is attached to one end of a piston rod 120 which is operable with a hydraulic cylinder 118. The cylinder 118 is provided with an inlet conduit 122 and an outlet conduit 124. These conduits are connected to a suitable hydraulic circuit and controls (not shown) for operably moving the unit 58. Finally, an auxiliary handle 128 is mounted on the top of the pulley box 34 and is connected to the pulley 108 in case of a hydraulic failure.

In operation, a helicopter of the type described can be landed on the deck of a ship, for instance, with the "beartrap system" as described in U.S. Patent 3,303,807 mentioned above. Once the aircraft has been landed on the deck 20 it is required to secure the tail end of the aircraft to the deck 20 to prevent the aircraft from pivoting about the moored forward point.

Once the aircraft is landed the pilot then actuates a suitable control which forces hydraulic fluid into the outlet conduit 124 and the same to exhaust the inlet conduit 122. This extends the piston 120 and pulley bracket 114 causing the wire 106, extension 102, probe and mooring unit 58 and thus the inner sleeve 40 to extend downwardly by means of the spring 44 and gravity. As the probe and mooring unit 58 hits the false deck 22, its downward movement will be arrested. At this point, by merely moving the aircraft slightly from one side to the other the probe unit 58 will fall within a slot 26 under the force of the spring 44. The retainer sleeve 88 will abut against the shoulders 24 of the false deck 22 pushing it against spring 90. Up until now, the probe unit has been in the position shown in FIGURE 5 wherein the dogs 80 to 84 are concentrated centrally in the form of a ball and are locked there by the retainer sleeve 88. However as the retainer sleeve 88 is pushed upwardly against the spring 90 it releases the levers 86 of the dogs 80 to 84 allowing them to pivot about the pivot pin 78. As soon as these dogs 80 to 84 are allowed to pivot the central pin 94 which is biased downwardly by the spring 99 moves downwardly between the dogs 80 to 84 as shown in FIGURE 7. Of course this forces the dogs 80 to 84 to spread out and engage below the surface of the shoulders 24. The shape of the pin 94 in the position shown in FIGURE 7 also serves to lock the dogs 80 to 84 in such position.

The tail of the aircraft 10 is now secured to the deck and if it is required to move the aircraft into a hangar the probe and mooring unit 58 follow along the slot 26 in the direction to which the aircraft is being pulled, yet preventing the aircraft from moving in a direction lateral to the direction of movement.

When it is required to retract the mooring device the pilot moves the suitable control to allow the hydraulic fluid to enter the inlet conduit 122 and evacuate from the outlet conduit 124. This retracts the piston 120 and the pulley bracket 114 which pulls on the wire 106 which in turn lifts the extension rod 102 which is connected to the pin 94. By pulling the pin 94, it moves upwardly through the housing 60 releasing the dogs 80 to 84. As the radial flange 98 of the pin 94 engages an inner surface of the chamber 68 as shown in FIGURE 5 the sleeve 40 will then be pushed to move upwardly as a direct contact between the wire 106, extension 102, pin 94, flange 98 and the end of the sleeve 40 is obtained. By lifting the inner sleeve 40, the retainer ring will be allowed to slide downwardly under the tension of the spring 90 to again force the dogs 80 to 84 by means of the levers 86 to rotate inwardly and to become locked as shown in FIGURE 5. If the downward movement of the piston is continued the wire 106 continues to lift the mooring unit 58 and the inner sleeve 40 to be in a retracted position within the outer sleeve 38 as shown in FIGURE 3.

Of course, suitable switches can be provided at locations near the ends of the movement of extension 102 so as to signal the pilot as to the relative position of the mooring unit 58.

A small guillotine 117 is provided to cut wire 106 to release the tail probe in case of failure of the hydraulic system that operates piston rod 120. As is well known, the pilot controls this operation by pushing a button (not shown) and an explosive charge in the guillotine 117 is ignited by electrical means; the explosion forces a blade to cut the wire.

I claim:

1. A mooring apparatus for mooring an aircraft or the like to an anchoring member, the mooring apparatus comprising a tubular body extending from the aircraft, the outward end of the tubular body being opened and having locking dogs protruding therefrom, a means movable axially within the tube and biased to move the dogs to a spread, locking position; retaining means suitable to retain the dogs in an unlocked position, and being movable to release the dogs to allow them to be spread by said movable means to a locking position.

2. A mooring apparatus as defined in claim 1 wherein the retaining means comprises an annular sleeve which is adapted to slide axially on the tubular body in a spring bias to normally abut the dogs and retain them in an unlocked position.

3. A mooring dvice as defined in claim 1 wherein the tubular body comprises a pair of telescopically associated hollow tubes wherein the outer tube is secured to the body of the aircraft and the inner telescopic tube includes said outward end of the tubular body, and means operable to telescopically extend the tubular body away from the aircraft and retract it within the aircraft.

4. A mooring device as defined in claim 1 wherein the anchoring member is in the form of a raised flat deck which defines spaced apart parallel slots.

5. A mooring apparatus as defined in claim 1 wherein the outward end of the tubular body defines a rim, and the locking dogs are pivoted on the rim and are adapted to pivot in a radial plane between an assentially concentrated first position and an outwardly expanded second position; said axially movable means comprising an axially elongated pin being mounted for axial reciprocating sliding movement within the tube from a first position axially between the locking dogs and the second position retracted therefrom within the body normally biasing the pin towards the first position; and retaining means for locking the dogs in a first position and the pin in its second position whereby the retaining means is operable to release the locking dogs thereby permitting the pin to move towards its first position forcing the dogs to spread to their second locking position.

6. A mooring apparatus as defined in claim 5 wherein the dogs are each of bell crank lever construction having a ball segment shaped portion.

7. A mooring apparatus as defined in claim 3 wherein the pin is operatively connected through the telescopic tubes to a hydraulic lifting mechanism within the aircraft, and includes means for engaging the inner telescopic tube as the movable means is being lifted thereby retracting the apparatus within the aircraft.

8. A fastener adapted to fasten a body to an anchor member having shoulders defining a slot, the fastener comprising a hollow tubular member having one end adapted to be connected to the body, the other end having an open end defined by a rim; locking dogs pivoted to the rim of the tubular member for movement between a concentrated position whereby the dogs have a combined effective dimension less than the dimension of the slot and a spread position whereby the combined dimension of the dogs is greater than the dimension of the slot; a pin movable axially of the tubular member between a position between the dogs locking them in a spread position and a retracted position within the tubular member, a retaining sleeve movable on the tubular body between a position locking the dogs in a concentrated position and a retracted position releasing the dogs to move to a spread position.

9. A fastener as defined in claim 8 wherein the retainer is normally biased to a position locking the dogs and the pin is normally biased to a position spreading the dogs and means are provided for retracting the pin.

10. A mooring device as defined in claim 7 wherein an upwardly extending mounting frame is provided with the aircraft securing the other tube to the aircraft, and extension rod is connected to the pin, extending upwardly through the inner tube and the frame, the lifting means comprising a hydraulic piston and cylinder cooperating to lift the extension rod upward within the frame.

11. A mooring apparatus for mooring an aircraft or the like to an anchoring member, the mooring apparatus comprising a tubular body extending from the aircraft, the outward end of the tubular body being opened and having locking dogs protruding therefrom, retaining means suitable to retain the dogs in an unlocked position, means movable axially within the tube and biased to move the dogs to a spread, anchoring position, and said retaining means being movable to release the dogs to allow them to be spread by said movable means to a locking position, and means operable to retract said movable means whereby said dogs can return to an unlocked position.

12. A fastener comprising a tube adapted at one end to be secured to a body to be fastened and open at the other end, a plurality of spreadable locking dogs mounted to extend from the open end of the tube, locking means movable axially within the tube and biased to spread the dogs from a contracted position, in which they can enter an opening in an object to which the body is to be fastened, to a spread position, in which they cannot be withdrawn through the opening, and retaining means movable between a closed position, in which it retains the dogs in the contracted position against the biased action of the locking means, and an open position in which it allows the dogs to move to the spread position.

References Cited

UNITED STATES PATENTS

| 2,403,456 | 7/1946 | Pitcairn | 244—110 |
| 3,075,731 | 1/1963 | Bennett et al. | 244—115 |
| 3,151,826 | 10/1964 | Michel | 244—115 |

FOREIGN PATENTS

| 1,253,269 | 1/1961 | France. |

MILTON BUCHLER, Primary Examiner

PAUL E. SAUBERER, Assistant Examiner

U.S. Cl. X.R.

188—7; 244—115